United States Patent [19]

Illy

[11] 4,446,783
[45] May 8, 1984

[54] CYLINDRICAL BALER TWINE WRAPPING APPARATUS FOR WRAPPING BALE WITH TWO PIECES OF TWINE

[75] Inventor: Pierre Illy, Farrejueminef, France

[73] Assignee: Deere & Company, Moline, Ill.

[21] Appl. No.: 480,425

[22] Filed: Mar. 30, 1983

[30] Foreign Application Priority Data

Mar. 31, 1982 [EP] European Pat. Off. .......... 82 400591

[51] Int. Cl.³ .............................................. B65B 13/18
[52] U.S. Cl. ......................................... 100/5; 100/13
[58] Field of Search ................. 100/5, 13, 88; 56/341, 56/343

[56] References Cited

U.S. PATENT DOCUMENTS

| 2,971,455 | 2/1961 | Wade et al. | 100/5 |
| 3,064,556 | 11/1962 | Luebben | 100/5 |
| 4,150,527 | 4/1979 | Meiers | 56/341 |
| 4,158,331 | 6/1979 | Campbell | 100/5 |

FOREIGN PATENT DOCUMENTS

| 41444 | 9/1981 | European Pat. Off. | 100/5 |
| 2620807 | 11/1977 | Fed. Rep. of Germany | 100/5 |

Primary Examiner—Billy J. Wilhite

[57] ABSTRACT

In a baler for forming cylindrical bales, a twine wrapping apparatus comprises a pair of twine guides and a drive mechanism for simultaneously driving the guides transversely of the baler and for feeding two pieces of twine through an opening in the bale forming chamber. In accordance with the improvement, the drive means includes a drive interruption means constituted by a differential for preventing the driving of the twine guides when only one of the twine pieces is being fed into the chamber and wrapped around the bale. The differential includes two pulleys rotatably mounted on a drive input shaft to the twine guides. Each of the wrapping twines passes around one of the pulleys and entrains it for rotation when the twine is being pulled for wrapping around the bale. A planetary gear is rotatably mounted to a support fixed to the shaft and is meshed with annular gears on the inner sides of the pulleys. The twine guides are preferably constituted by a pair of arms mounted on a pivotally mounted support. The ends of the twine guides are spaced from each other by a distance correlated with the desired spacing of the twines around a bale. The twine wrapping apparatus provides the advantage of doubling the speed of traverse and thus reducing the wrapping time by one half, compared to a twine wrapping apparatus using a single twine arm for wrapping a bale with the same spacing of the wraps on the bale.

7 Claims, 3 Drawing Figures

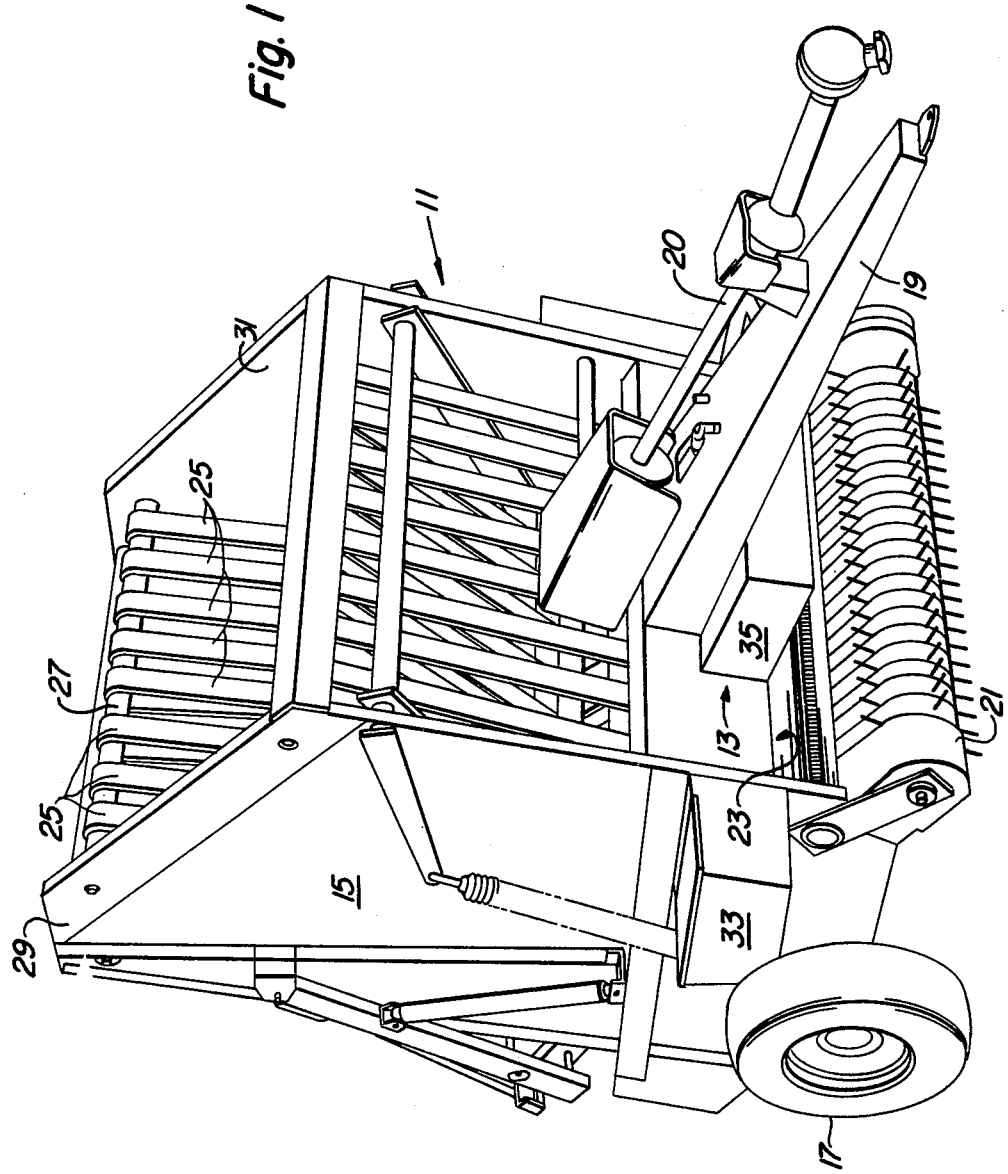

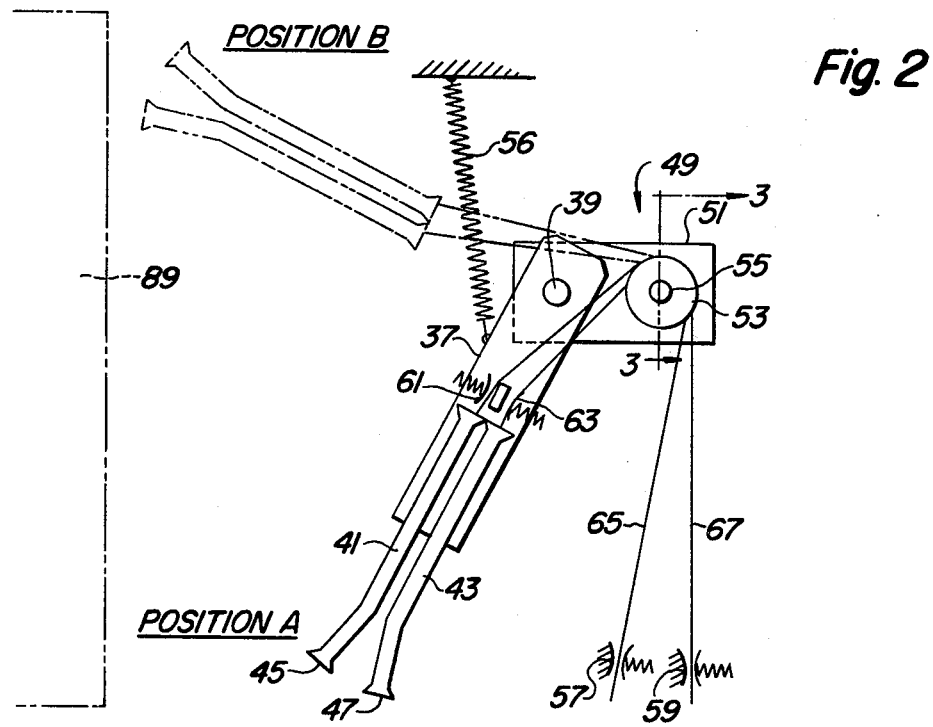
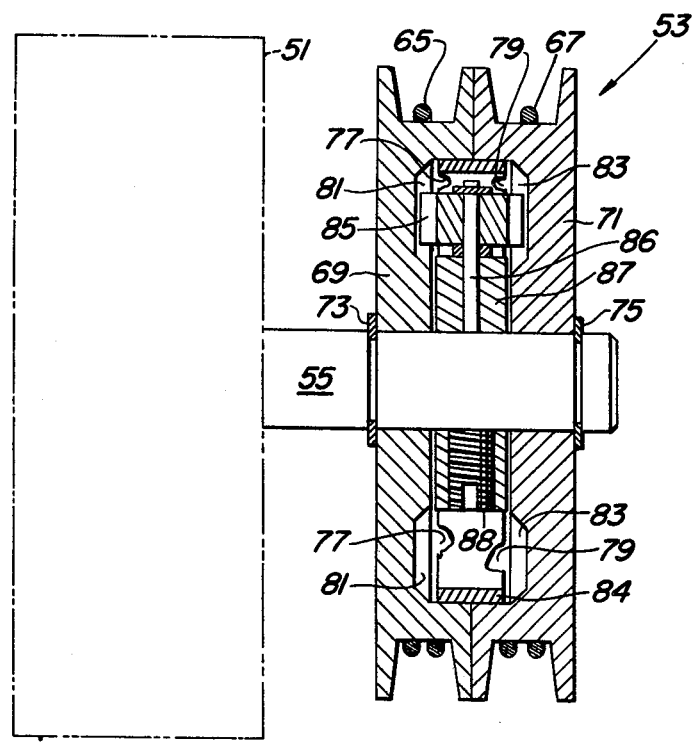

CYLINDRICAL BALER TWINE WRAPPING APPARATUS FOR WRAPPING BALE WITH TWO PIECES OF TWINE

BACKGROUND OF THE INVENTION

This invention relates to a baler for forming cylindrical bales (commonly referred to as a "cylindrical" or "round" baler).

Such balers are well known and comprise a bale forming chamber defined by a plurality of belts or chains supported on a plurality of transverse rollers. A bale is formed inside the chamber by driving the belts to roll up in spiral fashion the crop material such as forage or hay gathered from the ground during the advance of the baler. Typically, such bales are bound inside the bale forming chamber before being discharged on the ground. The binding operation is typically carried out by wrapping a twine spirally around the exterior of the bale. The wrapping of the twine is controlled by a twine guiding member which is displaceable transversely of the direction of the travel of the baler in front of the opening for infeeding crop material into the bale forming chamber. The end of the twine is caught by the rotating bale in the chamber and is withdrawn from a storage compartment such as a twine box provided on the chassis of the baler. Due to the tranverse displacement of the guiding member, the twine forms helical turns around the bale to insure the binding over the entire length of the bale.

The guiding member may be constituted by pivotally mounted arm or an arm which is linearly displaceable in front of the opening for crop material into the bale forming chamber.

During the wrapping operation, the infeeding of crop material into the bale forming chamber must be stopped as the chamber is being used in the wrapping operation. To reduce the wrapping time and, therefore, increase the productivity of the machine, it has been proposed in U.S. Pat. No. 3,064,556, U.S. Pat. No. 4,158,331 and European Patent Application 0 041 444 to provide a twine guiding member with two arms which are pivotally mounted and simultaneously displaced over respective paths one-half width of the bale chamber opening. Each arm guides one piece of twine into the bale forming chamber. In this way it is possible to cut the binding time approximately in half compared to a twine wrapping apparatus with a single twine guide arm for transversing the entire width of the bale forming chamber opening and for providing twine wrap spacing of equal distance on the bale.

In the apparatus disclosed in the patent literature listed above, each piece of twine is guided by a separate arm. Thus there is a potential risk that a bale will be defectively bound if one of the twine pieces is not engaged with the bale at the initiation of the wrapping operation. When this happens, only one half of the bale is wrapped and the wrapping operation must be repeated to assure bale integrity when the bale is ejected onto the ground.

In prior art wrapping apparatus with two twine guiding arms, the arms are usually pivotally mounted at spaced locations and in the wrapping operation are moved transversely of the baler in opposite directions. The pivotal mountings of the arms may be located close to the sides of the baler or alternately close to the longitudinal medial axis of the baler. Consequently, it is necessary to provide a drive mechanism which is capable of driving the arm simultaneously in opposite directions and is capable of reversing the direction of pivotal movement of the arms midway of the path of movement. These requirements complicate the design of the drive mechanism and increase the risk of a malfunction in severe operating conditions such as are encountered by this type of agricultural equipment.

SUMMARY OF THE INVENTION

Accordingly, it is an object of this invention to provide an improved twine wrapping mechanism utilizing a pair of twine guiding arms.

Another object of the invention is to provide such a twine wrapping apparatus which includes means for preventing the driving of both of the twine guides when only one piece of twine is being fed into the bale forming chamber and wrapped around the bale.

Still another object of the invention is to provide a twine wrapping apparatus comprising two twine guides which are displaced in the same direction during the wrapping operation.

These and other objects of the invention which will be apparent from the consideration of the following detailed description and accompanying claims are accomplished in a twine wrapping apparatus for a cylindrical baler including a bale forming chamber and an opening in the chamber as follows: The twine wrapping apparatus comprises a pair of twine guides and a means for simultaneously driving the guides tranversely of the baler for feeding two pieces of twine through the chamber opening and wrapping around a bale in the chamber. In accordance with a primary improvement of this invention, the drive means includes an interruption means for preventing the driving of the twine guides when only one piece of the twine is being fed into the chamber and wrapped around the bale. In accordance with the preferred embodiment, the drive interruption means comprises a pair of rotatable members. One piece of twine is mounted around and entrains in rotation the member when the twine piece is being wrapped around the bale in the chamber. The other piece of twine is mounted around and entrains in rotation the other member when the twine piece is being wrapped around the bale in the chamber. An intermediate element is interconnected between the rotatable chambers and provides a drive output to the twine guides only when the members are simultaneously rotated by both pieces of twine.

The drive means further comprises a drive input shaft interconnected to the twine guides. The rotatable members are pulleys rotatably mounted on the input shaft and having opposed annular gears on their inner walls. The intermediate element is a planet gear meshing with the opposed gears, pivotably mounted about an axis perpendicular to the input shaft and supported by a carrier fixed to the input shaft. The drive means constitutes a differential to prevent rotation of the drive input shaft for the twine guides when only one of the two twines is engaged at the beginning of the wrapping operation. The driver of the tractor for pulling the baler can thus correct the problem before ejection of a defectively wrapped bale.

Thus, when only one pulley is driven by the piece of twine around it when the wrapping operation is initiated, the rotation of the pulley merely produces, through the intermediate planet wheel meshing with the opposed inner annular gears, the rotation of the other pulley in the opposite direction. The other pulley can rotate freely without driving the drive input shaft because the piece of twine wrapped around it is not under tension.

The drive input shaft for the twine guides may, for example, be connected with an intermediate reduction gear which is in turn connected to the drive of the twine guides.

According to another feature of the invention, the twine guide may be constituted by a pair of arms which are formed integrally with each other, which are pivotally mounted at the same point and which are conjointly pivotally movable during the bale wrapping cycle. The free ends of the twine guides are spaced apart a sufficient distance to form helical windings of the twine around the bale which are spaced at an optimum distance when the arms are pivoted during the wrapping operation.

Thus, according to one advantageous disposition, the space between the free ends of the twine guides is in principle equal to the distance normally separating two consecutive turns of twine around the bale. This distance is, of course, a function of the peripheral speed of the bale and the speed of angular deflection of the guides. Accordingly, the spacing of the twine turns around the bale may be substantially equal to half that obtained with a single twine guide arm. Alternatively, for a given space between the turns which is satisfactory for retention of the crop material in the bale, the speed of angular deflection of the arms can be doubled. The latter alternative reduces the time for a wrapping cycle and thus the time during which bale formation must be stopped, thereby increasing the productivity of the baler.

According to another feature of the invention, each piece of twine is provided with a brake on the input and output sides of the differential. The brakes maintain the twine under sufficient tension to engage and rotate the pulleys of the differential when the twine is being fed into the bale forming chamber. The brakes may be constituted simply by a pair of spaced surfaces one of which is bias towards the other.

According to another feature of the invention, the twine guide support is pivotally mounted about an axis offset laterally to one side of the longitudinal axis of the baler to provide a concentration of turns of twine around the end of the baler adjacent to the other side of the longitudinal axis of the baler. Preferably, the twine guide arms make an angle of about 60° to 80° with the longitudinal axis of the baler when the free ends of the twine guides are adjacent to the other side of the baler. Thus, at the end of the wrapping operation, a concentration of turns, some of which may be superimposed, are provided on one end of the bale to aid in retaining the crop material in the bale. Also, a concentration of twine adjacent to the end of the bale closest to the pivot axis of the twine guides is produced by the dead time in the operation of a disengagable hub provided in the drive means for the twine guides. The dead time occurs at the initiation of the wrapping cycle between the time that the twines are first engaged by the bale and the time when the twine guides begin pivotal movement responsive to the pulling of the twine into the bale forming chamber.

BRIEF DESCRIPTION OF THE DRAWINGS

FIG. 1 is a perspective view of a cylindrical baler on which a twine wrapping apparatus in accordance with the features of this invention may be used.

FIG. 2 is a diagrammatic plan view of a preferred embodiment of a twine wrapping apparatus in accordance with the features of this invention.

FIG. 3 is a cross-sectional view of a differential of the twine wrapping apparatus taken along line 3—3 of FIG. 2.

DESCRIPTION OF THE PREFERRED EMBODIMENT

FIG. 1 shows a baler 11 for forming cylindrical bales and in which a twine wrapping apparatus 13 in accordance with the features of the invention herein may be embodied. Baler 11 is conventional except for twine wrapping apparatus 13 and may be constructed in accordance with U.S. Pat. No. 4,150,527, the disclosure of which is hereby incorporated herein by reference. For brevity, baler 11 will only be briefly described herein.

Baler 11 includes a frame or body 15 supported on a pair of wheels 17 (only one shown). Baler 11 is intended to be drawn behind a tractor by coupling the tractor to a tongue 19. Power is supplied to baler 11 through a drive shaft 20 connectable to the power take-off of the tractor used for pulling baler 11. A pickup 21 is provided at the lower front of body 15 and gathers crop material, such as forage, from the ground and feeds the crop material through an opening 23 rearwardly of pickup 21 into a bale forming chamber (not shown). The chamber is defined by a plurality of belts 25 supported on a plurality of rollers 27 (only one shown) extending between sidewalls 29, 31. The crop material is formed into a bale in the chamber by driving belts 25 and rolling the crop material fed into the chamber through an opening 23 into a spirally wound cylinder.

Baler 11 further includes a twine supply box 33 for storing and dispensing a supply of twine to twine wrapping apparatus 13 for wrapping a bale formed in the bale forming chamber. Twine wrapping apparatus 13 is housed in a protective enclosure 35.

Reference is now made to FIGS. 2 and 3 which show in diagrammatic plan view a preferred embodiment of a twine wrapping apparatus 13 in accordance with the features of this invention. As shown in FIG. 2, twine wrapping apparatus 13 includes a support 37 mounted on a pivot 39 and a pair of tubular twine guide arms 41, 43 for a pair of twine pieces 65, 67. Pivot 39 is laterally offset (toward the right side) from the median longitudinal axis of the baler 11. The offset location results in the location of additional twine wraps around the right side of a bale. The main body of arms 41, 43 are fixed on support 37 parallel to each other. Arms 41, 43 also include divergent twine outlet ends 45, 47. The distance between the extremities of ends 45, 47 is substantially equal to the desired interval between the helical turns of twines to be formed around a bale during a twine wrapping operation.

Twine guide arms 41, 43 are driven traversely of baler 11 by a drive means 49. Drive means 49 includes reduction gearing 51 (diagrammatically shown) of any conventional type, and drive interruption means 53 for preventing the driving of arms 41, 43 when only one of the twines 65, 67 are being wrapped around a bale in the bale forming chamber of baler 11. Means 53 is mounted on an input shaft 55 of reduction gearing 51. The pivot shaft 39 on which support 37 is mounted constitutes the output shaft of reduction gearing 51. Shaft 39 and reduction gearing 51 are preferably interconnected by a disengageable hub or similar means such as a ratchet and pawl, to permit support 37 and pivot shaft 39 to be rotated in one direction independently of reduction gearing 51. The rotation of support 37 independently of reduction gearing permits guide arms 41, 43 to be moved from one side of baler 11 to the other by an independent drive means such as a spring 56. Drive means 56 rapidly and independently moves the twine arms 41, 43 to a position B when twine wrapping cycle is initiated from a position A on the opposite side of the baler corresponding to the location at which the wrapping cycle operation is completed. A conventional manual control (not shown) may be provided to initiate a wrapping cycle by releasing a latch (not shown) holding arms 41, 43 in position A against the tension of spring 56. The movement of the twine arms 41, 43 to position B is used to start twine pieces 65, 67 wrapping around a bale in the chamber.

Brakes 57, 59 and 61, 63 are provided on the input and output sides, respectively, of drive interruption means 53 to maintain twine pieces 65, 67 sufficiently tensioned to insure that drive interruption means 53 is rotated with twine pieces 65, 67 as the twine pieces 65, 67 are wrapped around a bale during a twine wrapping operation. Brakes 57, 59, 61 and 63 may be comprised of a pair of opposed members one of which is resiliently biased toward the other.

Reference is now made to FIG. 3 which is a cross-sectional view of drive interruption means 53 taken along line 3—3 in FIG. 2. It will be appreciated that, while the embodiment shown in FIG. 3 is preferred, other embodiments will be apparent to those skilled in the art. In the illustrated embodiment, drive interruption means 53 is constituted by a differential 53. Differential 53 is comprised of a pair of rotatable elements 69, 71 here shown in the preferred form as pulleys 69, 71. Pulleys 69, 71 are freely rotatably mounted side-by-side on input shaft 55 of reduction gearing 51 and are located axially on shaft 55 by split washers 73, 75. One or two turns of the twine pieces 65, 67 are wrapped around the grooves respectively of pulleys 69, 71.

Pulleys 69, 71 are each formed with a cavity 77, 79, respectively, and have annular gears 81, 83 formed on the inner sidewalls forming the cavities. A ring 84 is located within cavities 77, 79 to maintain the inner peripheries of pulleys 69, 71 in alignment. A planet wheel or gear 85 is rotatably mounted on shaft 86 and is meshed with annular gears 81, 83. Shaft 86 is fixedly supported in a planet carrier or ring 87 which is keyed to input shaft 55 by a set screw 88.

OPERATION

As shown in FIG. 2, twine guide arms 41, 43 at the beginning of a twine wrapping operation are located in position A. For the purpose of explanation, a bale 89 is shown adjacent to twine wrapping apparatus 13 in the same relative location as it would be located in the bale forming chamber of the baler 11 when the bale 89 would be subjected to a twine wrapping operation. Twine wrapping apparatus 13 is operable in two modes. The first or normal mode is when both twines 65, 67 are in place and are simultaneously used to wrap bale 89. The second mode is when the supply for one of twines 65, 67 is exhausted or, for some other reason, only one of twines 65, 67 becomes engaged with bale 89 at the initiation of the wrapping cycle.

In the normal mode of operation, a twine wrapping operation is initiated by the driver of the tractor manually (through means not shown) or may be actuated automatically when bale 89 reaches a predetermined diameter. Upon initiation of the wrapping operation, the twine guide arms 41, 43 are pivoted into position B by spring 56. The pivotal movement of the arms 41, 43 from position A to position B releases the free ends of both twine pieces. As a result, the free ends of twines 65, 67 first fall into the path of crop material coming into the baler, then are pulled into the bale forming chamber with the incoming hay and finally are engaged by the bale to initiate the wrapping of twine around bale 89.

The pulling of twines 65, 67 into the chamber by bale 89 as twines 65, 67 are wrapped around the rotating bale 89 causes pulleys 69, 71 to rotate together. When both pulleys 69, 71 are driven by the pulling of the twine pieces 65, 67 into the bale forming chamber, the twine guide arms 41, 43 are driven via drive means 49. The driving action is imparted from the twine pieces 65, 67 initially to pulleys 69, 71. The pulleys 69, 71 are drivable together via engagement of annular gears 81, 83 with planet gear 85. The planet wheel 85 is pivotably mounted on shaft 86 fixed in planet carrier 87 keyed to input shaft 55 of reduction gearing 51. Thus, as pulleys 69, 71 are simultaneously driven; plant gear 85, planet carrier 87 and input shaft 55 are driven integrally together and with pulleys 69, 71 to drive reduction gearing 51. Reduction gearing 51 in turn provides a drive output to pivot shaft 39 which causes support 37 and twine guide arms 41, 43 to be pivoted in a counterclockwise direction in FIG. 2 from position B, (FIG. 2) to position A. Position A is reached at the end of the wrapping operation.

Brakes 57, 59, 61, 63 maintain twine pieces 65, 67 under sufficient tension so that the one or two turns formed around pulley 69, 71 are sufficiently tight to drive pulley 69, 71. Consequently, support 37 and twine guide arms 39, 41 are pivoted counterclockwise when the pieces of twine are pulled into the bale forming chamber of baler 11 and wrapped around bale 89.

The spacing of the ends 45, 47 of twine guide arms 41, 43 are spaced apart by a distance corresponding to the desired interval between the turns of twine on bale 89. It can be appreciated that the speed of traverse or rate of angular deflection of twine guide arms 41, 43 about pivot 39 can be doubled compared to the speed normally required to obtain the same interval between helical turns on a bale using a twine wrapping apparatus with a single twine arm. As a result, the time required for wrapping of a bale and consequently the time during which the baler 11 cannot be used to gather crop material from the ground for formation of a bale are correspondingly reduced.

To improve bale integrity, additional wraps of twine are applied to each end of the bale in two ways. First, as previously indicated, a disengageable hub is provided between the output of reduction gearing 51 and pivot shaft 39. Because of the response time for engaging the hub to initiate driving of pivot shaft 39 at the beginning of twine arm movement from position B to A, a concentration of turns of twine is produced on the end of the bale. Secondly, as shown in FIG. 2, the location of pivot shaft 39 for twine guide arms 41, 43 is laterally offset with respect to the median longitudinal axis of baler 11 and of bale 89 located in the bale forming chamber. The shaft 39 is offset closer to the end of the bale at which wrapping is initiated. As a result, twine guide arms 41, 43 at the initiation of wrapping make a small angle with the longitudinal axis of baler 11. The angle may, for example, be between 10 and 20 degrees. Near the end of the wrapping operation, the twine guide arms 41, 43 form a much larger angle which may be between 60 and 80 degrees. As a result of the substantially transverse location of the twine guide arms 41, 43 at the end of the wrapping cycle, twine will be concentrated adjacent the right side of bale 89. In this way twine is concentrated adjacent both ends of bale 89 to aid in the retention of the crop material in the bale.

In the second mode of operation of apparatus 13, due to a malfunction, only one twine of the two twine pieces 65, 67, e.g., twine 65 is engaged by bale 89 at the initiation of a wrapping operation. In this case, traction, resulting from the pull of the twine by bale 89 is applied only to twine 65. Consequently, only pulley 69 is rotationally driven. Because no traction is applied to twine 67, the turn or the turns of twine around the pulley 71 is not tightened. As a result, pulley 71 can rotate freely relative to twine 67. The rotational drive of pulley 69 drives planet wheel 85 via its meshing engagement with one of annular gear 81. Planet gear 85 in turn drives the opposite annular gear 83 to impart a rotational drive to pulley 71 in an opposite direction about shaft 55. Thus, with the rotation of planet gear 85 about pivot 86, planet carrier 87 and shaft 55 keyed thereto, remain stationary. Thus, no pivotal movement is transmitted to twine guide arms 41, 43 and the wrapping operation is, thus, not initiated. The initiation of the wrapping operation is initiated only when both pieces of twine are engaged by being wrapped around bale 89. Because the wrapping operation has not been initiated, the driver can, thus, readily detect the malfunction of the wrapping operation and can take corrective action.

It will thus be seen in accordance with the features of this invention, the wrapping operation is initiated only when both pieces of twine are being pulled into the chamber and being wrapped around a bale located therein. In addition, the wrapping operation may be accomplished at an increased rate (with the same twine spacing) compared to a twine wrapping apparatus using a single twine guide arm. Furthermore, the twine wrapping apparatus of this invention provides a concentration of twine wraps adjacent each end of the bale which improves the retention of the crop material in the bale and improves the bale shape.

While the invention has been described in connection with certain preferred embodiments thereof, other embodiments and modifications thereof will be apparent to those skilled in the art. For example, linearly movable twine guides may be used in lieu of pivotably movable guides. Accordingly, it is intended that all such embodiments and modifications thereof are comprehended within the scope of the appended claims.

What is claimed is:

1. In a twine wrapping apparatus for a cylindrical baler comprising a bale forming chamber and an opening in said chamber, said apparatus comprising:
   a pair of twine guides on said baler and means for simultaneously driving said guides transversely of said baler for feeding pieces of twine through said opening and into said chamber for wrapping around a bale formed in said chamber;
   the improvement wherein said drive means includes a drive interruption means for preventing the driving of said twine guides when only one of said twine pieces is being fed into said chamber and wrapped around the bale in said chamber.

2. The apparatus of claim 1 wherein said drive interruption means comprises:
   (a) a pair of rotatable members, one of said pieces of twine mounted around and entraining in rotation one of said rotatable members when said one twine piece is being wrapped around the bale in said chamber and the other of said pieces of twine mounted around and entraining in rotation the other of said rotatable members when said other twine piece is being wrapped around a bale in said chamber; and
   (b) an intermediate element interconnected with said rotatable members for providing a drive output to said twine guides when said members are simultaneously rotated by both pieces of said twine.

3. The apparatus of claim 2 wherein:
   (a) said drive means further comprises a drive input shaft interconnected to twine guides;
   (b) each said rotatable member is a pulley rotatably mounted on said shaft, said pulleys having opposed gears; and
   (c) said intermediate element comprises: (1) a planet carrier fixed to said shaft intermediate said pulleys; and (2) a planet gear pivotably mounted about an axis perpendicular to said input shaft, supported by said carrier and meshing with said opposed gears.

4. The apparatus of claims 2 or 3 further comprising respective braking means applied to the input and output ends of said twine pieces passing around said rotatable members for maintaining said twine pieces under tension sufficient to drive said rotatable members when said twine pieces are pulled at the output ends.

5. The apparatus of claim 2 or 3 wherein said twine guides comprise a support pivotably mounted on said baler and a pair of arms fixed to said support for conjoint pivotal movement together and with said support.

6. The apparatus of claim 5, wherein said arms have twine output ends spaced apart to form two spaced helical windings around a bale in said chamber when said arms are pivoted during a twine wrapping operation.

7. The apparatus of claim 5 wherein said support is pivoted about an axis offset laterally to one side of the median longitudinal axis of said baler to provide a concentration of turns of twine around the end of a bale adjacent the other side of the longitudinal axis of said baler.

* * * * *